(12) United States Patent
Iwasaki

(10) Patent No.: US 10,956,090 B2
(45) Date of Patent: Mar. 23, 2021

(54) MEMORY SYSTEM AND ELECTRONIC APPARATUS

(71) Applicant: KYOCERA Document Solutions Inc., Osaka (JP)

(72) Inventor: Yukio Iwasaki, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/482,673

(22) PCT Filed: Feb. 2, 2018

(86) PCT No.: PCT/JP2018/003501
§ 371 (c)(1),
(2) Date: Jul. 31, 2019

(87) PCT Pub. No.: WO2018/235327
PCT Pub. Date: Dec. 27, 2018

(65) Prior Publication Data
US 2020/0012455 A1    Jan. 9, 2020

(30) Foreign Application Priority Data

Jun. 20, 2017  (JP) .................. JP2017-120175

(51) Int. Cl.
*G06F 3/06* (2006.01)
(52) U.S. Cl.
CPC .......... *G06F 3/0659* (2013.01); *G06F 3/0611* (2013.01); *G06F 3/0616* (2013.01); *G06F 3/0685* (2013.01)
(58) Field of Classification Search
None
See application file for complete search history.

(56) References Cited

U.S. PATENT DOCUMENTS 6,347,055 B1 * 2/2002 Motomura ........... G11C 7/1051
365/189.05
2001/0002475 A1   5/2001 Bothwell
(Continued)

FOREIGN PATENT DOCUMENTS

JP    H10-133940 A    5/1998
JP    H11-141391 A    5/1999
(Continued)

OTHER PUBLICATIONS

World Intellectual Property Organization. Written Opinion of the International Searching Authority, dated Mar. 20, 2018.

*Primary Examiner* — Charles Rones
*Assistant Examiner* — Jonah C Krieger
(74) *Attorney, Agent, or Firm* — Hawaii Patent Services; Nathaniel K. Fedde; Kenton N. Fedde

(57) ABSTRACT

Life of a non-volatile memory is extended without increasing processing time due to turning power ON/OFF.
An EEPROM stores counter information and setting information, a first RAM and a second RAM store counter information and setting information, a memory management unit manages a storage area in the first RAM for the counter information and setting information so as to be updatable and manages a storage area in the second RAM for the counter information and setting information so as not to be updatable, and a system control unit, when a change in contents of the counter information and the setting information occurs, rewrites the counter information and the setting information in the first RAM in accordance to the changed contents, and when the power is turned OFF, reads and compares the counter information and the setting information in the first RAM with the counter information and the setting information in the second RAM, and writes only different data to the EEPROM.

5 Claims, 4 Drawing Sheets

(56) References Cited

U.S. PATENT DOCUMENTS

| | | | |
|---|---|---|---|
| 2011/0157653 A1* | 6/2011 | Oku .................... | G06K 15/408 |
| | | | 358/1.16 |
| 2015/0058526 A1* | 2/2015 | Venkata ............... | G06F 3/0659 |
| | | | 711/103 |
| 2016/0085585 A1* | 3/2016 | Chen .................. | G06F 12/0638 |
| | | | 711/154 |

FOREIGN PATENT DOCUMENTS

| JP | 2001-014840 A | 1/2001 |
|---|---|---|
| JP | 2005-275889 A | 10/2005 |

\* cited by examiner

EEPROM 115

COUNTER INFORMATION AND SETTING INFORMATION 117
SECOND RAM

COUNTER INFORMATION AND SETTING INFORMATION 116
FIRST RAM

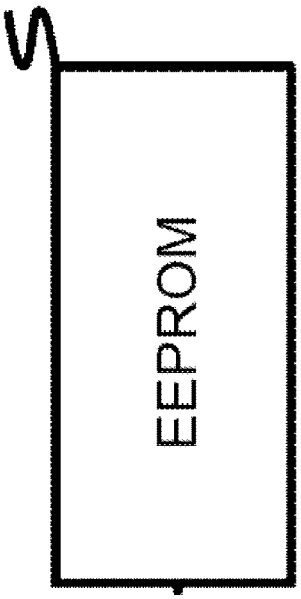

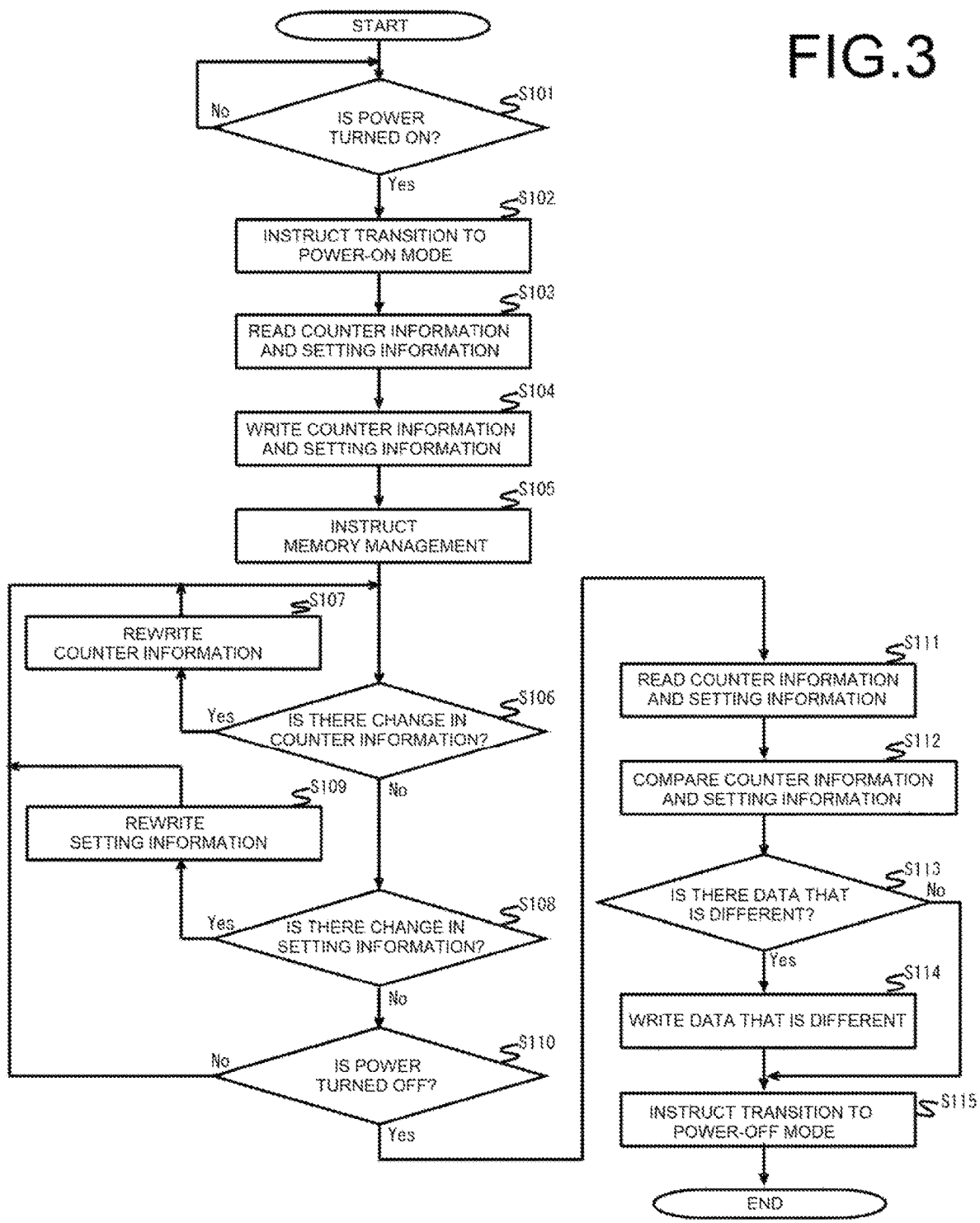

MEMORY SYSTEM AND ELECTRONIC APPARATUS

TECHNICAL FIELD

The present invention relates to a memory system and an electronic apparatus in which use of a non-volatile memory is suitable.

BACKGROUND ART

For example, an image forming apparatus such as an MFP (Multifunction Peripheral) and the like, which is one kind of electronic apparatus, is equipped with various consumable parts. In a case where a print function, a copy function, a FAX function, a data transmission/reception function via a network, and the like are installed, unit parts that execute these respective functions correspond as consumable parts. Moreover, a rewritable non-volatile memory, a volatile memory used as a work memory for executing a program, and the like also correspond as consumable parts. Note that, in a non-volatile memory, counter information for determining the replacement time or the like of each unit part, setting information related to each function, and the like are stored.

Incidentally, in an image forming apparatus, when the power is turned ON, the above-described setting information, counter information, and the like stored in the non-volatile memory are read from the non-volatile memory and expanded in the volatile memory. Moreover, in the power-ON state, when the above-described counter information is changed or the settings of the various functions are changed, the changed contents are stored in the volatile memory. Then, when the power of the image forming apparatus is turned OFF, the changed contents stored in the volatile memory are written to the non-volatile memory. As a result, when the power to the image forming apparatus is turned ON again, the previous counter information and setting information are taken over.

As described above, the changed contents stored in the volatile memory are written to the non-volatile memory each time the image forming apparatus is switched from power ON to power OFF. Therefore, when the power to the image forming apparatus is frequently switched between ON and OFF, the number of times that the changed contents are written to the non-volatile memory is increased, and the life of the non-volatile memory is shortened.

In order to solve such a problem, Patent Literature 1 proposes a control apparatus for automobiles that, when the key switch is turned OFF, only writes data to the non-volatile memory in a case where the contents of the volatile memory and the contents of the non-volatile memory are compared, and there is a difference between the data of both.

CITED LITERATURE

Patent Literature

Patent Literature 1: JP H11-141391 A

SUMMARY OF INVENTION

Technical Problem

In the control apparatus for an automobile of Patent Literature 1 described above, the writing of data to the non-volatile memory is performed only when there is a difference between the contents of the volatile memory and the contents of the non-volatile memory, so the number of times that writing is performed may be reduced.

Incidentally, in the non-volatile memory and the volatile memory, the respective structures and the like are different, so the methods of reading and writing the respective data are different. Moreover, in general, the speed of reading and writing data in a non-volatile memory is slower than the speed of reading and writing data in a volatile memory.

Therefore, when comparing the contents of non-volatile memory and the contents of volatile memory in accordance to turning OFF the key switch as in the control apparatus for an automobile of Patent Literature 1, reading of data from the non-volatile memory is slower than reading of data from the volatile memory, so there is a possibility that the time from the reading of the data to the completion of the writing of the different data to the non-volatile memory may become long.

Taking into consideration such a situation, an object of the present invention is to provide a memory system and an electronic apparatus capable of solving the problems described above.

Solution to Problem

The memory system according to the present invention includes: a non-volatile memory; a first volatile memory in which apparatus use related information stored in the non-volatile memory and that is related to use of an apparatus is written; a second volatile memory in which the apparatus use related information stored in the non-volatile memory is written; a memory management unit that manages a storage area for the apparatus use related information written in the first volatile memory so as to be updatable, and manages a storage area for the apparatus use related information written in the second volatile memory so as not to be updatable; and a system control unit that writes the apparatus use related information read from the non-volatile memory to the first volatile memory and the second volatile memory in accordance with turning power ON; wherein the system control unit, when a change in contents of the apparatus use related information occurs, rewrites the apparatus use related information in the first volatile memory according to the changed contents; and when the power is turned OFF, reads and compares the apparatus use related information in the first volatile memory with the apparatus use related information in the second volatile memory, and only writes different data to the non-volatile memory.

The electronic apparatus according to the present invention includes: a non-volatile memory; a first volatile memory in which apparatus use related information stored in the non-volatile memory and that is related to use of an apparatus is written; a second volatile memory in which the apparatus use related information stored in the non-volatile memory is written; a memory management unit that manages a storage area for the apparatus use related information written in the first volatile memory so as to be updatable, and manages a storage area for the apparatus use related information written in the second volatile memory so as not to be updatable; and a system control unit that writes the apparatus use related information read from the non-volatile memory to the first volatile memory and the second volatile memory in accordance with turning power ON; wherein the system control unit, when a change in contents of the apparatus use related information occurs, rewrites the apparatus use related information in the first volatile memory according to the changed contents; and when the power is turned OFF, reads and compares the apparatus use related information in the first volatile memory with the apparatus use related information in the second volatile memory, and only writes different data to the non-volatile memory.

In the memory system and electronic apparatus according to the present invention, the non-volatile memory stores apparatus use related information related to use of an apparatus, the first volatile memory stores apparatus use related information, the second volatile memory stores apparatus use related information, the memory management unit manages a storage area in the first volatile memory for the apparatus use related information so as to be updatable and manages a storage area in the second volatile memory for the apparatus use related information so as not to be updatable, and the system control unit, when the power is turned ON, writes the apparatus use related information read from the non-volatile memory to the first volatile memory and the second volatile memory. Moreover, the system control unit, when a change in the contents of the apparatus use related information occurs, rewrites the apparatus use related information in the first volatile memory in accordance to the changed contents, and when the power is turned OFF, reads and compares the apparatus use related information in the first volatile memory with the apparatus use related information in the second volatile memory, and writes only the different information to the non-volatile memory.

Here, the first volatile memory and the second volatile memory have shorter information read/write times than the non-volatile memory. Therefore, when the power is turned OFF, the system control unit may perform reading and comparison of the apparatus use related information in the first volatile memory and the apparatus use related information in the second volatile memory in a short time. In addition, when the power is turned OFF, the system control unit writes only the different information to the non-volatile memory, so the number of times of writing information to the non-volatile memory may be reduced, and the amount of information written to the non-volatile memory may be reduced.

Advantageous Effects of Invention

With the memory system and the electronic apparatus according to the present invention, comparison of the apparatus use related information in the first volatile memory and the apparatus use related information in the second volatile memory by the system control unit may be performed in a short time, as well as the number of times of writing information to the non-volatile memory may be reduced and the amount of information written to the non-volatile memory may be reduced, so the life of the non-volatile memory may be extended without increasing the processing time due to turning the power ON/OFF.

BRIEF DESCRIPTION OF DRAWINGS

FIG. 2B is a diagram for describing a method of writing counter information and setting information of an EEPROM by the system control unit in FIG. 1, and illustrates an example of a case of writing counter information and setting information to a first RAM, and then writing the counter information and setting information written to the first RAM to a second RAM 117.

FIG. 3 is a flowchart for describing a process related to reading and writing of counter information and setting information to and from the EEPROM in accordance with turning the power ON/OFF to the MFP in FIG. 1.

DESCRIPTION OF EMBODIMENTS

In the following, an embodiment of an electronic apparatus according to the present invention will be described with reference to FIGS. 1 to 3. Note that as an example of the electronic apparatus in the following description is an MFP (Multifunction Peripheral) which is a complex peripheral apparatus equipped, for example, with a print function, a copy function, a FAX function, a data transmission/reception function via a network, and the like.

Figure 1:
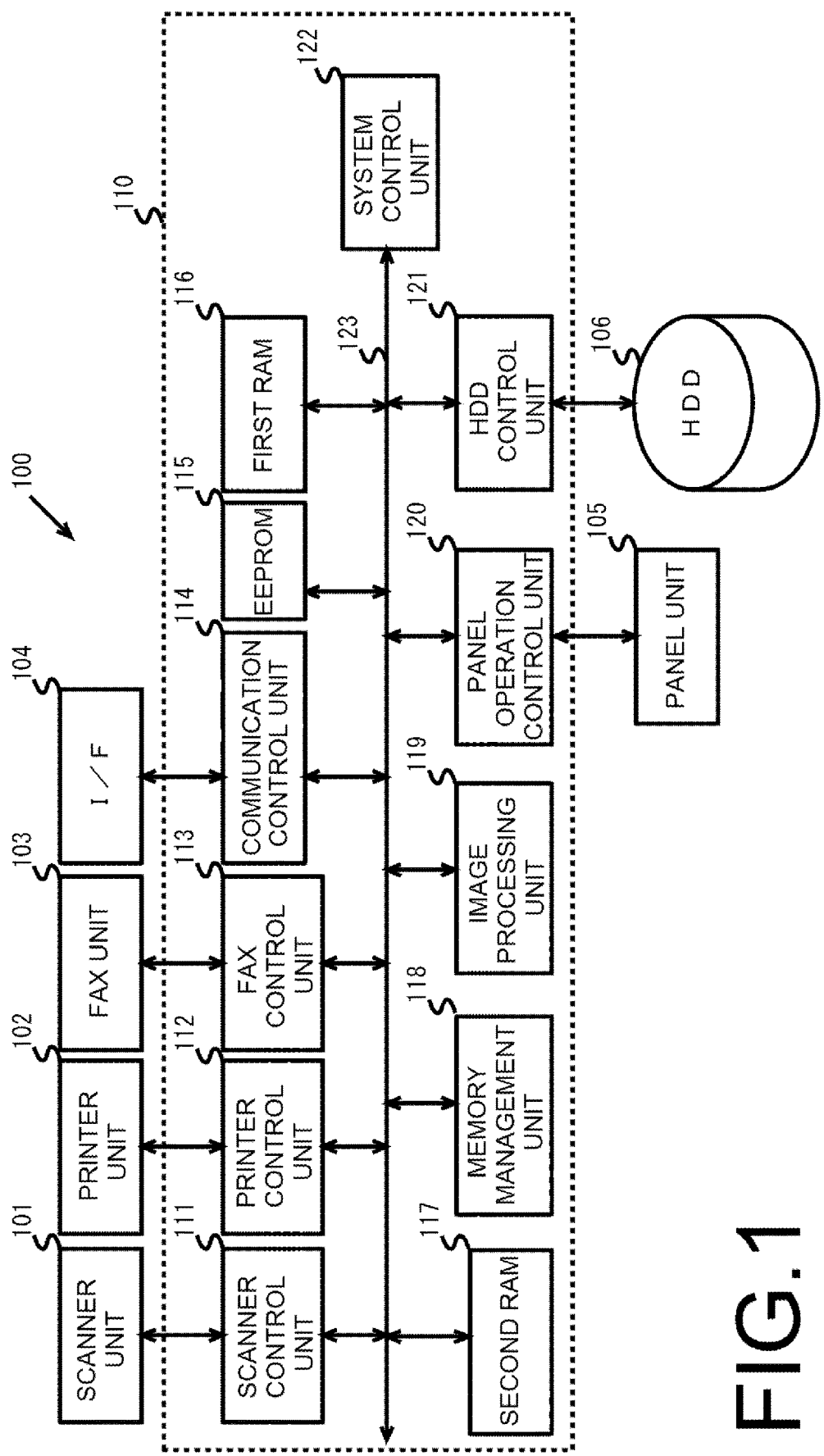
FIG. 1 is a diagram for explaining an embodiment in a case where an electronic apparatus according to the present invention is applied to an MFP.

First, as illustrated in FIG. 1, the MFP 100 includes a control unit 110 that controls the operation of a scanner unit 101, a printer unit 102, a FAX unit 103, an I/F (interface) 104, a panel unit 105, and a HDD (Hard Disk Drive) 106. Note that although a case is presumed in which the MFP 100 according to this embodiment is installed with the HDD 106, the HDD 106 may not be installed.

The scanner unit 101 is a device that converts an image on a sheet of paper (not illustrated) that is read by an image sensor (not illustrated) into digital image data, and inputs the digital image data to the control unit 110. The printer unit 102 is a device that prints an image onto a sheet of paper (not illustrated) based on printing data outputted from the control unit 110. The FAX unit 103 is a device that transmits data outputted from the control unit 110 to a facsimile of another party via a telephone line and that receives data from a facsimile of another party and inputs the data to the control unit 110.

The I/F 104 is in charge of communication with other MFPs 100, user terminals and the like via a network. Note that the I/F 104 may also be in charge of communication with a content server, a web server, or the like (not illustrated). The panel unit 105 is a device having a touch panel and hardware keys for performing, for example, a print function, a copy function, a FAX function, a data transmission/reception function via a network, and a display for various settings of the MFP 100. The HDD 106 is a storage device that stores application programs and the like for providing various functions of the MFP 100.

The control unit 110 is a processor that executes an application program such as an authentication program or the like, an image forming program, a control program, and the like to control the overall operation of the MFP 100. The control unit 110 includes a scanner control unit 111, a printer control unit 112, a FAX (facsimile) control unit 113, a communication control unit 114, an EEPROM (electrically erasable and programmable read-only memory) 115, a first RAM (random access memory) 116, a second RAM 117, a memory management unit 118, an image processing unit 119, a panel operation control unit 120, an HDD control unit 121, and a system control unit 122. Moreover, these units are connected to a data bus 123. Note that the HDD control unit 121 may be omitted in a case where the MFP 100 is not equipped with the HDD 106.

The scanner control unit 111 controls the reading operation of the scanner unit 101. The printer control unit 112 controls the printing operation of the printer unit 102. The FAX control unit 113 controls data transmission and reception operations of the FAX unit 103. The communication control unit 114, via the I/F 104, performs control of transmission and reception of data and the like via a network. The EEPROM 115 stores a control program or the like for performing an operation check or generating a startup sequence of each unit. In addition, the EEPROM 115 stores counter information and setting information. Here, the counter information includes a counter value for determining a replacement time or the like of a unit part that executes a print function, a copy function, a FAX function, a data transmission/reception function via a network, and the like, a counter value such as the number of printed sheets and the like required for billing, or the like. The setting information includes various information that is set in the print function, the copy function, the FAX function, the data transmission/ reception function via a network, and the like. Incidentally, the non-volatile memory is not limited to being an EEPROM 115, and a flash memory (registered trademark) may be used.

The first RAM 116 (first volatile memory) and the second RAM 117 (second volatile memory) store the above-described counter information and setting information stored in the EEPROM 115 when the power to the MFP 100 is turned ON. Note that when the power to the MFP 100 is turned ON, the contents of the counter information and setting information stored in the first RAM 116 and the second RAM 117 are the same at the point in time before using the MFP 100. However, for example, the counter information and the setting information in the first RAM 116 are updated in accordance with a change in the counter value and a change in the setting contents that accompanies the use of the MFP 100. On the other hand, the counter information and setting information stored in the second RAM 117 are held without being updated.

In addition, the first RAM 116 and the second RAM 117 are work memory for executing programs. In this case, for example, the work area may be increased by preferentially using the first RAM 116 as a work memory and using the second RAM 117 as a work memory when the area of the first RAM 116 becomes insufficient. In addition the first RAM 116 and the second RAM 117 store printing data that has undergone image processing by the image processing unit 119. In this case, for example, by preferentially using the first RAM 116 for storing printing data that has undergone image processing (rasterizing) by the image processing unit 119, and using the second RAM 117 to store printing data that has undergone image processing (rasterizing) by the image processing unit 119 when the area in the first RAM 116 becomes insufficient, the storage area for printing data may be increased.

Based on an instruction from the system control unit 122, the memory management unit 118, for example, manages the storage area in the first RAM 116 for the counter information and setting information in an updatable manner in accordance with changes in the counter value that accompanies the use of the MFP 100. In addition, the memory management unit 118 manages the storage area in the second RAM 117 for the counter information and setting information so as not to be updatable. Moreover, based on an instruction from the system control unit 122, the memory management unit 118, for example, manages the first RAM 116 so as to be preferentially usable as a work memory, and manages the second RAM 117 so as to be usable as a work memory when the area of the first RAM 116 becomes insufficient. Furthermore, the memory management unit 118, for example, manages the first RAM 116 so as to be capable of preferentially storing printing data that has undergone image processing (rasterizing) by the image processing unit 119, and manages the second RAM 117 so as to be capable of storing printing data that has undergone image processing (rasterizing) by the image processing unit 119 when the area of the first RAM 116 becomes insufficient.

Incidentally, the memory management unit 118 may reverse the management of the first RAM 116 and the second RAM 117. In other words, the memory management unit 118 may manage the storage area in the second RAM 117 for the counter information and the setting information so as to be updatable, and manage the storage area in the first RAM 116 for the counter information and the setting information so as not to be updatable. Moreover, the memory management unit 118 may manage the second RAM 117 so as to be preferentially usable as a work memory, and manage the first RAM 116 so as to be usable as a work memory when the area of the second RAM 117 becomes insufficient. Furthermore, the memory management unit 118 may manage the second RAM 117 so as to be capable of preferentially storing printing data that has undergone image processing (rasterizing) by the image processing unit 119, and manage the first RAM 116 so as to be capable storing printing data that has undergone image processing (rasterizing) by the image processing unit 119 when the area of the second RAM 117 becomes insufficient.

The image processing unit 119 performs image processing (rasterizing) on the image data read by the scanner unit 101. In addition, the image processing unit 119 performs image processing (rasterizing) on printing jobs registered in a user box of the HDD 106 or printing data in a page description language (PDL: Page Description Language). Note that the system control unit 122 temporarily stores printing data that has undergone image processing by the image processing unit 119 in the first RAM 116 or the second RAM 117.

The panel operation control unit 120 controls the display operation of the panel unit 105. In addition, the panel operation control unit 120, via the panel unit 105, receives settings for printing, copying, faxing, data transmission/ reception via a network, and the like. Moreover, the panel operation control unit 120, via the panel unit 105, receives an operation for turning ON/OFF the power to the MFP 100. In this case, by causing the panel unit 105 to display a power-ON button and a power-OFF button, the panel operation control unit 120 may receive an operation for turning the power ON or OFF by a touch operation of either one of the buttons. Here, the power-ON button and the power-OFF button displayed by the panel unit 105 may be one power button. In this case, the panel operation control unit 120 alternately receives power ON and power OFF each time the power button is touch-operated. Note that turning ON the power means, for example, returning from the power-OFF mode to the power-ON mode. Moreover, turning OFF the power means, for example, returning from the power-ON mode to the power-OFF mode. Furthermore, the process of returning from the power-OFF mode to the power-ON mode and the process of returning from the power-ON mode to the power-OFF mode are executed by the system control unit 122 controlling a power control unit (not illustrated). The HDD control unit 121 controls reading data from and writing data to the HDD 106 and the like.

Figure 2A:
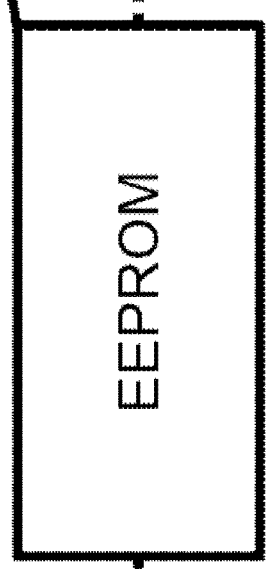
FIG. 2A is a diagram for describing a method of writing counter information and setting information of an EEPROM by the system control unit in FIG. 1, and illustrates an example of a case of writing counter information and setting information simultaneously to a first RAM and a second RAM.
Figure 2A:
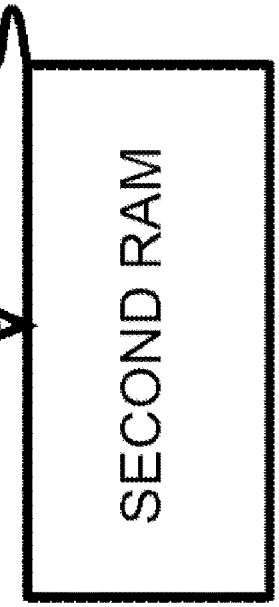
Figure 2A:
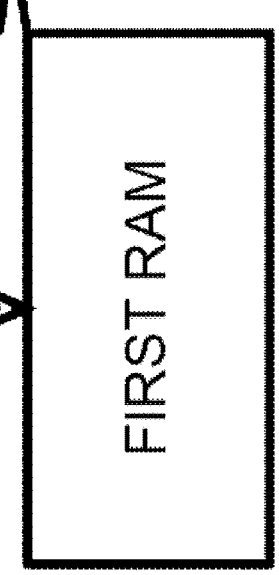

The system control unit 122 controls cooperative operation and the like of each unit. In addition, when the power of the MFP 100 is turned ON, the system control unit 122 reads the counter information and setting information described above from the EEPROM 115 and writes the information in the first RAM 116 and the second RAM 117. Here, when writing the counter information and setting information read from the EEPROM 115 to the first RAM 116 and the second RAM 117, the system control unit 122 may execute either of the two methods illustrated in FIGS. 2A and 2B. First, the system control unit 122, for example, may execute a method of simultaneously writing the counter information and the setting information read from the EEPROM 115 to the first RAM 116 and the second RAM 117 as illustrated in FIG. 2A. In other words, the system control unit 122 may directly write the counter information and the setting information read from the EEPROM 115 to the first RAM 116 and the second RAM 117. In this method, the counter information and setting information read from the EEPROM 115 may be written to the first RAM 116 and the second RAM 117 at one time, so the time until the startup of the MFP 100 is completed may be shortened. In other words, the first RAM 116 and the second RAM 117 have short data read/write times. Therefore, the system control unit 122 may execute writing of the counter information and the setting information to the first RAM 116 and the second RAM 117 in a short time. Incidentally, startup of the MFP 100 means that a program for initializing each functional unit is executed in accordance with the startup sequence.

Moreover, the system control unit 122, for example, as illustrated in FIG. 2B, may execute a method of writing counter information and setting information read from the EEPROM 115 to the first RAM 116 beforehand, reading counter information and setting information from the first RAM 116, and writing that information to the second RAM 117. In other words, the system control unit 122 may directly write the counter information and the setting information read from the EEPROM 115 to the first RAM 116, and indirectly write the information to the second RAM 117.

Incidentally, the writing process according to the methods illustrated in FIGS. 2A and 2B are executed in the startup sequence of the MFP 100 or in parallel with the startup sequence. In addition, when the startup of the MFP 100 is completed and the writing of the counter information and the setting information to the first RAM 116 and the second RAM 117 is completed, the system control unit 122 enables use of the MFP 100.

Furthermore, when the power to the MFP 100 is turned OFF, the system control unit 122 reads and compares the counter information and setting information stored in the first RAM 116 with the counter information and setting information stored in the second RAM 117, and only writes the different data to the EEPROM 115. Here, as described above, the first RAM 116 and the second RAM 117 have short data read/write times. Therefore, since the read time of the counter information and the setting information from the first RAM 116 and the second RAM 117 executed when the system control unit 122 compares the counter information and the setting information is short, the comparison of the counter information and the setting information from both is also performed in a short time. Moreover, of the counter information and the setting information from both, the system control unit 122 writes only the different data to the EEPROM 115, so the transition time to the power-OFF mode when the power of the MFP 100 is turned OFF may be shortened.

Next, a process related to reading and writing counter information and setting information to and from the EEPROM 115 when the power of the MFP 100 is turned ON/OFF will be described with reference to FIG. 3. Note that in the following, a case as illustrated in FIG. 2A for example in which the system control unit 122 simultaneously writes the counter information and the setting information read from the EEPROM 115 to the first RAM 116 and the second RAM 117 will be described. Moreover, turning the power to the MFP 100 ON/OFF as described below is performed via the panel unit 105.

(Step S101)

The system control unit 122 determines whether or not the power is turned ON.

In this case, the system control unit 122 determines that the power is not turned ON unless there is a notification from the panel operation control unit 120 via the panel unit 105 indicating that the power-ON button has been touch-operated (step S101: NO).

On the other hand, when there is a notification from panel operation control unit 120 via panel unit 105 indicating that the power-ON button is touch-operated, the system control unit 122 determines that the power is turned ON (step S101: YES), and the process moves to step S102.

(Step S102)

The system control unit 122 instructs transition to the power-ON mode.

In this case, the system control unit 122 instructs the power control unit (not illustrated) to transition to the power-ON mode.

(Step S103)

The system control unit 122 reads the counter information and the setting information.

In this case, the system control unit 122 reads the counter information and the setting information from the EEPROM 115.

(Step S104)

The system control unit 122 writes the counter information and the setting information.

In this case, the system control unit 122 writes the counter information and the setting information read from the EEPROM 115 to the first RAM 116 and the second RAM 117.

(Step S105)

The system control unit 122 instructs the memory management unit 118 to perform memory management.

At this time, the memory management unit 118, for example, manages the storage area in the first RAM 116 for the counter information and setting information so as to be updatable in accordance with changes in the counter value and changes in the setting contents that accompanies the use of the MFP 100. In addition, the memory management unit 118 manages the storage area in the second RAM 117 for the counter information and setting information so as not to be updatable. Moreover, the memory management unit 118, for example, manages the first RAM 116 so as to be preferentially usable as a work memory, and manages the second RAM 117 so as to be usable as a work memory when the area of the first RAM 116 becomes insufficient. Furthermore, the memory management unit 118, for example, manages the first RAM 116 so as to be capable of preferentially storing printing data that has undergone image processing (rasterizing) by the image processing unit 119, and manages the second RAM 117 so as to be capable of storing printing data that has undergone image processing (rasterizing) by the image processing unit 119 when the area of the first RAM 116 becomes insufficient.

(Step S106)

The system control unit 122 determines whether or not there is a change in the counter information.

In this case, the system control unit 122, for example, determines that there is no change in the counter information when the counter value corresponding to any one of the print function, the copy function, the FAX function, and the data transmission/reception function via a network does not change (step S106: NO), then processing moves to step S108.

On the other hand, the system control unit 122 determines that there is change in the counter information when the counter value corresponding to any one of the print function, the copy function, the FAX function, and the data transmission/reception function via a network changes (step S106: YES), then processing moves to step S107.

(Step S107)

The system control unit 122 rewrites the counter information.

In this case, the system control unit 122 confirms that the memory management unit 118 is managing the storage area in the first RAM 116 for the counter information so as to be updatable, and rewrites the counter information in the first RAM 116 based on the counter value corresponding to any one of the print function, the copy function, the FAX function, and the data transmission/reception function via a network.

(Step S108)

The system control unit 122 determines whether or not there is a change in the setting information.

In this case, the system control unit 122 determines that there is no change in the setting information when there is no notification from the panel operation control unit 120 via the panel unit 105 indicating that there is an operation to change the setting for any one of the print function, the copy function, the FAX function, and the data transmission/ reception function via a network (step S108: NO), then processing moves to step S110.

On the other hand, the system control unit 122 determines that there is a change in the setting information when there is a notification from the panel operation control unit 120 via the panel unit 105 indicating that there is an operation to change the setting for any one of the print function, the copy function, the FAX function, and the data transmission/ reception function via a network (step S108: YES), then processing moves to step S109.

(Step S109)

The system control unit 122 rewrites the setting information.

In this case, the system control unit 122 confirms that the memory management unit 118 is managing the storage area in the first RAM 116 for the counter information so as to be updatable, and rewrites the setting information in the first RAM 116 based on the setting contents corresponding to any one of the print function, the copy function, the FAX function, and the data transmission/reception function via a network.

(Step S110)

The system control unit 122 determines whether or not the power is turned OFF.

In this case, the system control unit 122 determines that the power is not turned OFF unless there is a notification from the panel operation control unit 120 via the panel unit 105 indicating that the power-OFF button has been touch-operated (step S110: NO), then processing returns to step S106.

On the other hand, the system control unit 122 determines that the power is turned OFF when there is a notification from the panel operation control unit 120 via the panel unit 105 indicating that the power-OFF button has been touch-operated (step S110: YES), then processing moves to step S111.

(Step S111)

The system control unit 122 reads the counter information and the setting information.

In this case, the system control unit 122 reads the counter information and the setting information from the first RAM 116 and the second RAM 117.

(Step S112)

The system control unit 122 compares the counter information and the setting information.

In this case, the system control unit 122 compares the counter information and setting information read from the first RAM 116 with the counter information and setting information read from the second RAM 117.

(Step S113)

The system control unit 122 determines whether or not there is data that is different.

Here, the counter information and setting information in the second RAM 117 are managed by the memory management unit 118 so as not to be updatable, so the contents are the same as the counter information and setting information stored in the EEPROM 115. On the other hand, the counter information and setting information in the first RAM 116 are managed by the memory management unit 118 so as to be updatable, so the contents are changed in accordance with changes in the counter value and changes in the setting contents.

The system control unit 122 compares the counter information and setting information read from the first RAM 116 with the counter information and setting information read from the second RAM 117 for each storage unit (for example, for each 1 byte), and in a case where a difference in data cannot be confirmed, determines that there is no data that is different (step S113: NO), and the process moves to step S115.

On the other hand, the system control unit 122 compares the counter information and setting information read from the first RAM 116 with the counter information and setting information read from the second RAM 117, and in a case where a difference in data can be confirmed, determines that there is data that is different (step S113: YES), and the process moves to step S114.

(Step S114)

The system control unit 122 writes the data that is different.

In this case, the system control unit 122 writes only different data to the EEPROM 115. More specifically, the system control unit 122 writes the different data read from the first RAM 116 to the EEPROM 115 and does not write the same data to the EEPROM 115.

(Step S115)

The system control unit 122 instructs transition to the power-OFF mode.

In this case, the system control unit 122 instructs the power control unit (not illustrated) to transition to the power-OFF mode.

In this way, in this embodiment, the EEPROM 115 (non-volatile memory) stores counter information and setting information (apparatus use related information) related to the use of MFP 100 (apparatus), the first RAM 116 (first volatile memory) stores counter information and setting information (apparatus use related information), the second RAM 117 (second volatile memory) stores counter information and setting information (apparatus use related information), the memory management unit 118 manages a storage area in the first RAM 116 (first volatile memory) for the counter information and setting information (apparatus use related information) so as to be updatable and manages a storage area in the second RAM 117 (second volatile memory) for the counter information and setting information (apparatus use related information) so as not to be updatable, and the system control unit 122 writes counter information and setting information (apparatus use related information) read from the EEPROM 115 (non-volatile memory) to the first RAM 116 (first volatile memory) and the second RAM 117 (second volatile memory) in accordance with turning the power ON. In addition, when there is a change in the contents of the counter information and setting information (apparatus use related information), the system control unit rewrites the counter information and setting information (apparatus use related information) in the first RAM 116 (first volatile memory) in accordance to the changed contents, and when the power is turned OFF, the system control unit reads and compares the counter information and setting information (apparatus use related information) in the first RAM 116 (first volatile memory) with the counter information and setting information (apparatus use related information) in the second RAM 116 (second volatile memory), and writes only the different information to the EEPROM 115 (non-volatile memory).

Here, the first RAM 116 (first volatile memory) and the second RAM 117 (second volatile memory) have shorter information read/write times than the EEPROM 115 (non-volatile memory). Therefore, when the power is turned OFF, the system control unit 122 may perform reading and comparison of the counter information and setting information (apparatus use related information) in the first RAM 116 (first volatile memory) and the counter information and setting information (apparatus use related information) in the second RAM 116 (second volatile memory) in a short time. In addition, when the power is turned OFF, the system control unit 122 writes only the different information to the EEPROM 115 (non-volatile memory), so the number of times of writing information to the EEPROM 115 (non-volatile memory) may be reduced, and the amount of information written to the EEPROM 115 (non-volatile memory) may be reduced.

In this way, writing of the counter information and the setting information (apparatus related information) to the first RAM 116 (first volatile memory) and the second RAM 117 (second volatile memory) and comparison of the counter information and the setting information (apparatus use related information) in the first RAM 116 (first volatile memory) with the counter information and the setting information (apparatus use related information) in the second RAM 117 (second volatile memory) by the system control unit 122 may be performed in a short time, and in addition, the number times of writing information to the EEPROM 115 (non-volatile memory) may be reduce, as well as the amount of information written to the EEPROM 115 (non-volatile memory) may be reduced, so the life of the non-volatile memory may be extended without increasing the processing time due to turning the power ON/OFF.

Note that the system control unit 122 may also execute a method of writing the counter information and the setting information read from the EEPROM 115 to the first RAM 116 beforehand, and then after startup of the MFP 100 is completed, reading the counter information and the setting information from the EEPROM 115 in a background process and writing the information in the second RAM 117. In this method, the counter information and setting information read from the EEPROM 115 may first be written to the first RAM 116, so the time until the startup of the MFP 100 is completed may be shortened. In this case, when the startup of the MFP 100 is completed and the writing of the counter information and the setting information to the first RAM 116 is completed, the system control unit 122 enables the use of the MFP 100.

In addition, the first RAM 116 and the second RAM 117 may each be a separate memory module. Moreover, the first RAM 116 and the second RAM 117 may be provided in one memory module as one or a plurality of memory chips. In this case, the first RAM 116 and the second RAM 117 may each be one or a plurality of memory chips. Alternatively, the first RAM 116 and the second RAM 117 may be one or a plurality of memory chips in common, and the storage areas for the respective first RAM 116 and the second RAM 117 may be allocated to one or a plurality of memory chips.

In addition, the apparatus use related information is not limited to the counter information and the setting information, and may be only the setting information.

Furthermore, in the present embodiment, the MFP 100 is used as an example of an electronic apparatus, however the present invention may be applied to other electronic apparatuses such as a multi-function printer, a PC (Personal Computer), and the like.

The invention claimed is:

1. A memory system comprising:
a non-volatile memory storing a program;
a first volatile memory in which apparatus use related information stored in the non-volatile memory and that is related to use of an apparatus is written;
a second volatile memory in which the apparatus use related information stored in the non-volatile memory is written; and
a processor configured for executing the program;
wherein
when the program is in execution, the processor acts
as a memory management unit that manages a storage area for the apparatus use related information written in the first volatile memory so as to be updatable, and manages a storage area for the apparatus use related information written in the second volatile memory so as not to be updatable, and
as a system control unit that reads the apparatus use related information stored in the non-volatile memory and then writes the apparatus use related information read from the non-volatile memory to each of the first volatile memory and the second volatile memory in accordance with turning power ON; and
the system control unit,
when said use of the apparatus occurs, rewrites the apparatus use related information written in the first volatile memory to reflect said occurrence of said use, and keeps the apparatus use related information written in the second volatile memory the same as before said occurrence of said use; and
when the power is turned OFF,
reads and compares the apparatus use related information in the first volatile memory with the apparatus use related information in the second volatile memory, thereby determining whether there is a difference between the apparatus use related information written in the first volatile memory and the apparatus use related information written in the second volatile memory, and then
writes the apparatus use related information written in the first volatile memory to the non-volatile memory only when it is determined that there is the difference, thereby avoiding writing the apparatus use related information written in the first volatile memory to the non-volatile memory when it is determined that there is no difference between the apparatus use related information written in the first volatile memory and the apparatus use related information written in the second volatile memory.

2. The memory system according to claim 1, wherein the system control unit, after writing the apparatus use related information to the first volatile memory, reads the apparatus use related information from the first volatile memory, and writes the apparatus use related information to the second volatile memory.

3. The memory system according to claim 1, wherein the system control unit, after writing the apparatus use related information to the first volatile memory, reads the apparatus use related information from the non-volatile memory in the background, and writes the apparatus use related information to the second volatile memory.

4. The memory system according to claim 1, wherein the first volatile memory and the second volatile memory are provided in one memory module.

5. An electronic apparatus comprising:
a non-volatile memory storing a program;
a first volatile memory in which apparatus use related information stored in the non-volatile memory and that is related to use of an apparatus is written;
a second volatile memory in which the apparatus use related information stored in the non-volatile memory is written;
a processor configured for executing the program;
wherein
when the program is in execution, the processor acts
as a memory management unit that manages a storage area for the apparatus use related information written in the first volatile memory so as to be updatable, and manages a storage area for the apparatus use related information written in the second volatile memory so as not to be updatable; and
as a system control unit that reads the apparatus use related information stored in the non-volatile memory and then writes the apparatus use related information read from the non-volatile memory to each of the first volatile memory and the second volatile memory in accordance with turning power ON; and
the system control unit,
when said use of the apparatus occurs, rewrites the apparatus use related information written in the first volatile memory to reflect said occurrence of said use, and keeps the apparatus use related information written in the second volatile memory the same as before said occurrence of said use; and
when the power is turned OFF,
reads and compares the apparatus use related information in the first volatile memory with the apparatus use related information in the second volatile memory, thereby determining whether there is a difference between the apparatus use related information written in the first volatile memory and the apparatus use related information written in the second volatile memory, and then
writes the apparatus use related information written in the first volatile memory to the non-volatile memory only when it is determined that there is the difference, thereby avoiding writing the apparatus use related information written in the first volatile memory to the non-volatile memory when it is determined that there is no difference between the apparatus use related information written in the first volatile memory and the apparatus use related information written in the second volatile memory.

* * * * *